(12) United States Patent
Ku et al.

(10) Patent No.: US 7,140,780 B2
(45) Date of Patent: Nov. 28, 2006

(54) BEARING ASSEMBLY

(75) Inventors: Chin-Long Ku, Tu-Cheng (TW);
Chin-Wen Yeh, Tu-Cheng (TW);
Chih-Hao Yang, Tu-Cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 108 days.

(21) Appl. No.: 10/930,384

(22) Filed: Aug. 31, 2004

(65) Prior Publication Data
US 2005/0185866 A1    Aug. 25, 2005

(30) Foreign Application Priority Data
Feb. 20, 2004    (CN)    ............ 2004 2 0042843

(51) Int. Cl.
*F16C 17/04*    (2006.01)
(52) U.S. Cl. ............................................ 384/420
(58) Field of Classification Search ............... 384/110, 384/271, 272, 275, 420
See application file for complete search history.

(56) References Cited

U.S. PATENT DOCUMENTS 5,264,748 A    11/1993    Ootsuka et al. ............... 310/90
6,911,748 B1 *    6/2005    Kull ........................... 384/100

* cited by examiner

*Primary Examiner*—Lenard A. Footland
(74) *Attorney, Agent, or Firm*—Morris Manning & Martin; Tim Tingkang Xia, Esq.

(57) ABSTRACT

A bearing assembly includes a sleeve bearing (2) having a mating portion (22) and a center bore (20), a shaft (1) disposed in the center bore, and a rotary block (3) mounted on the shaft and being rotatable therewith. A gap exists between the inner circumferential surface of the bearing and the outer circumferential surface of the shaft to allow the shaft to be capable of rotate in the bore without scrapping the bearing. The rotary block includes a mounting portion (30) engaging with the mating portion of the bearing, whereby the rotary block is rotatably supported on the bearing.

19 Claims, 5 Drawing Sheets

BEARING ASSEMBLY

TECHNICAL FIELD

The present invention relates to a bearing system, and particularly to an improvement of bearing assembly used for fans.

BACKGROUND

With the improvement of operation speed of recent electric devices such as data storage devices, the speed of the reading-writing and locating is accelerated accordingly. Thus, more and more heat is generated. In order to maintain the electric devices work normally, the heat generated by the electric devices must be dissipated rapidly. Fans act an important role during the heat dissipation. The design and lifetime of bearings in the fans determine the performance and the life of the fans.

An example of a conventional bearing structure is shown in FIG. 8. The bearing structure comprises a rotary shaft 1a and a stationary bearing 2a which defines a central bore 3a for receiving the shaft 1a. A small gap is formed between the shaft 1a and the bearing 2a for holding lubricating oil therein. However, when the gap is too narrow, the lubricating oil will be extruded out of the gap so that large-area dry friction exists between the shaft 1a and the bearing 2a. This results in the bearing structure wearing out to thereby reduce the lifetime of the bearings structure and generate undesired noise. On the contrary, when the gap is significantly wide, the shaft 1a is prone to sway radially or unsteadily to generate noise as well.

A new bearing structure that overcomes the above-mentioned disadvantages is desired.

SUMMARY OF THE INVENTION

Accordingly, an object of the present invention is to provide a bearing assembly which has a long lifespan and generates less noise.

To achieve the above-mentioned object, a bearing assembly in accordance with the present invention comprises a sleeve bearing having a mating portion and a center bore, a shaft disposed in the center bore, and a rotary block mounted on the shaft and being rotatable therewith. A gap exists between the inner circumferential surface of the bearing and the outer circumferential surface of the shaft to allow the shaft to rotate in the bore without friction existing between the shaft and the bearing. The rotary block comprises a mounting portion engaging with the mating portion of the bearing, whereby the rotary block is rotatably supported on the bearing.

Other objects, advantages and novel features of the present invention will be drawn from the following detailed description of the preferred embodiments of the present invention with attached drawings, in which:

DETAILED DESCRIPTION OF PREFERRED EMBODIMENTS

Figure 1:
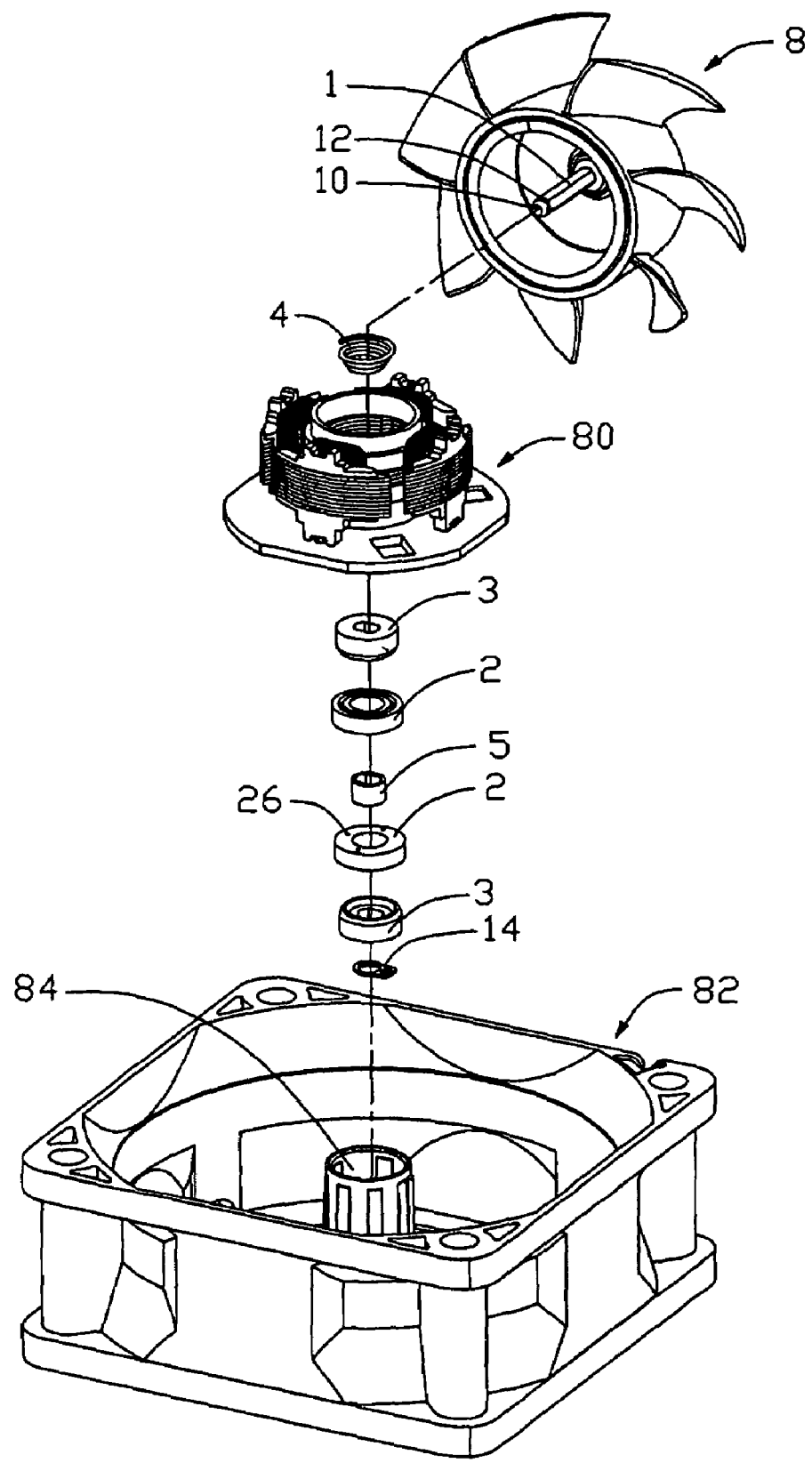
FIG. 1 is an exploded, isometric view of a bearing system used in a fan in accordance with the first embodiment of the present invention.

Referring to FIG. 1, a bearing system is used in a fan. The fan includes a rotor 8, a stator 80, a bearing system, a ring 14 and a frame 82. The bearing system includes a shaft 1, two sleeve bearings 2, two rotary blocks 3 and a coil spring 4. The frame 82 comprises a central tube 84. An annular shoulder 86 (shown in FIG. 3) is formed on the inner surface of the central tube 84.

The shaft 1 has a column shape with two vertical sections cut away symmetrically from two opposite sides thereof. A semispherical-shaped guiding portion 10 is formed at a distal end of the shaft 1. An annular slot 12 is defined in the vicinity of the guiding portion 10 for receiving the ring 14. The shaft 1 is provided with absorbent material 5 (shown in FIG. 3) for holding lubricating oil.

Figure 2:
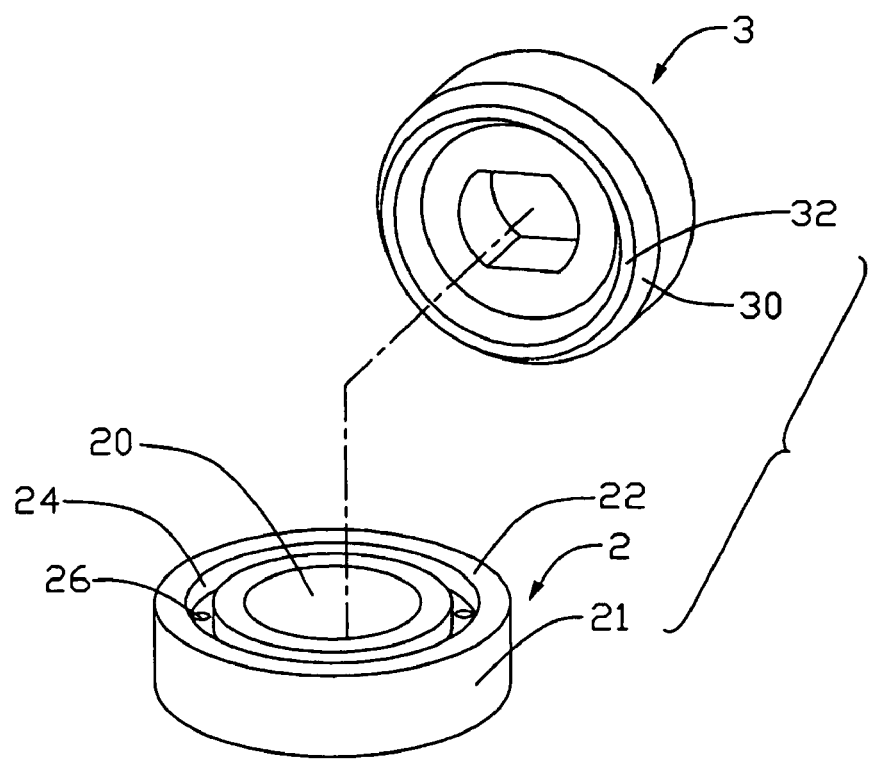
FIG. 2 is an enlarged view of a rotary block and a sleeve bearing of the bearing system of FIG. 1, viewed from another aspect.

Referring to FIG. 2, the sleeve bearing 2 is made of ceramic or other sintered material. A plurality of internal wicking structure such as slits or round holes is formed inside of the bearing 2. Each bearing 2 comprises a circumferential wall 21, a mating portion 22 formed at the top of the circumferential wall 21 and a central bore 20. The mating portion 22 defines an annular recess 24. A plurality of slots 26 communicating with the annular recess 24 is defined in and extends through each bearing 2. The internal diameter of the central bore 20 is larger than the external diameter of the shaft 1.

The rotary block 3 is made of ceramic or other sintered material. Each block 3 defines a central bore having a profile mating with the shaft 1 and a mounting portion 30 for engaging with the mating portion 22 of the bearings 2. An annular flange 32 protrudes from the mounting portion 30 as an extension corresponding to the annular recess 24. The cross section of the flange 32 is trapezoid. The flange 32 is adapted to be received in the recess 24 to form a linear contact between the flange 32 and the recess 24 when the rotary block 3 engages with the bearing 2.

Figure 3:
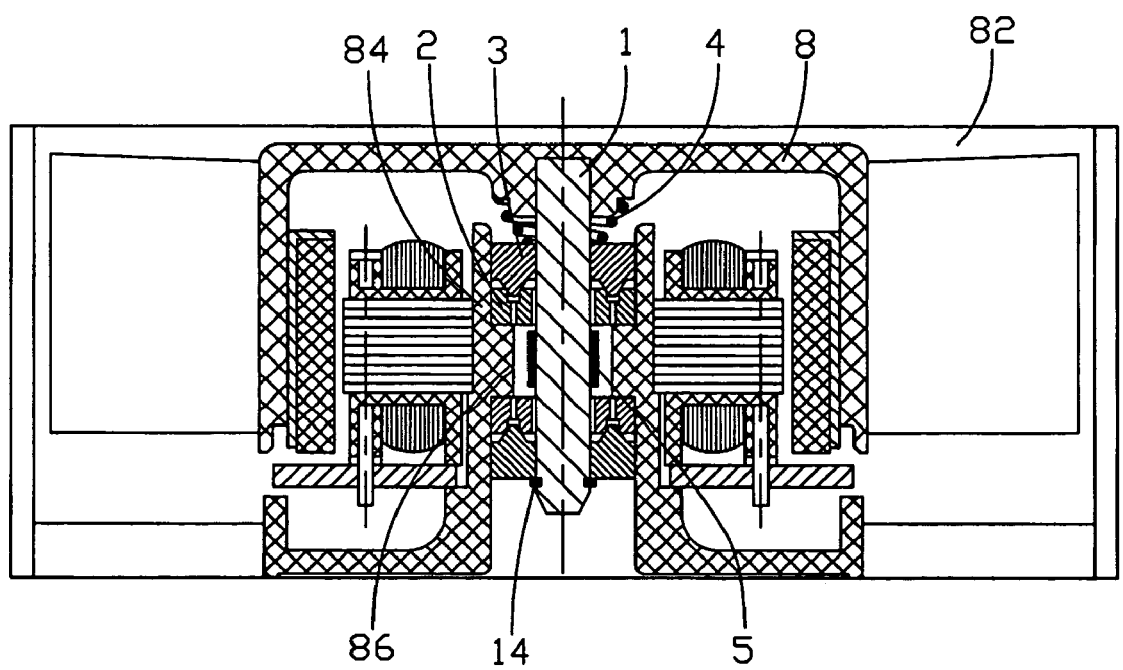
FIG. 3 is a cross-sectional view of the bearing system assembled in the fan of FIG. 1.

Referring also to FIG. 3, the stator 80 is fixed around the central tube 84 of the frame 82. The rotor 8 pivotably surrounds the stator 80. The coil spring 4, the rotary blocks 3, the bearings 2 and the adsorbent material 5 are disposed on the shaft 1. The inner surface of the central tube 84 firmly snatches the outer surface of the bearings 2 to maintain the bearings 2 to be stationary in the tube 84. The shoulder 86 of the central tube 84 is located between the two bearings 2 to prevent the bearings 2 from moving in the axial direction of the tube 84. A cavity is formed between the shaft 1, the tube 84 and the pair of bearings 2. The coil spring 4 is disposed between the rotor 8 and the upper one of the blocks 3 for providing the blocks 3 and the bearings 2 with a preset engaging pressure therebetween, whereby the blocks 3 maintains stationary relative to the bearings 2 in the axial direction of the shaft 1 when the blocks 3 rotate with the shaft 1. Alternatively, the coil spring 4 is disposed between the lower rotary block 3 spacing from the rotor 8 and the ring 14 the size of which is enlarged enough to support the coil spring 4. The mounting portion 30 of each rotary block 3 confronts the mating portion 22 of the corresponding bearing 2. The flange 32 of each block 3 enters in the annular recess 24 of the corresponding bearing 2 to cause the bearing 2 to rotatably hold the block 3 and the shaft 1. The absorbent material 5 is disposed on the shaft 1 in the cavity. Alternatively, the absorbent material 5 is disposed on the inner surface of the shoulder 86. The lubricating oil stored in the absorbent material 5 is pulled out when the material 5 rotates with the shaft 1 and pours into gap between contact areas of the bearings 2 and the blocks 3 through the slots 26 and internal wicking structure of the bearings 2 during the operation of the fan. A gap exists between the inner circumferential surfaces of the bearings 2 and the outer circumferential surface of the shaft 1 to allow the shaft 1 to rotate in the bearings 2 without friction between the shaft 1 and the bearings 2. Linear contact between the flange 32 of the block 3 and the bearing 2 in the annular recess 24 results in minor friction generated between the block 3 and the bearing 2 due to their relative movement, and friction therebetween reduces dramatically in comparison with prior arts.

Figure 4:
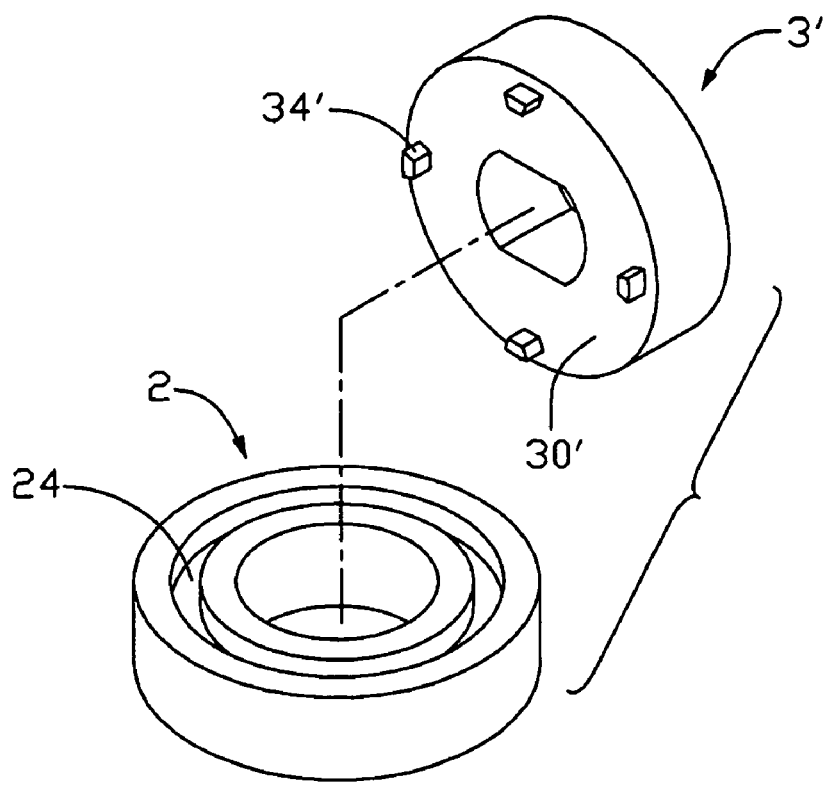
FIG. 4 is an isometric view of a rotary block and a sleeve bearing of the bearing system in accordance with the second embodiment of the present invention.

FIG. 4 shows the second embodiment of a block 3' of a bearing assembly of the present invention. The block 3' forms a mounting portion 30'. A plurality of bulges 34' extends from the mounting portion 30' for slidingly engaging in the corresponding annular recess 24 of the bearings 2.

FIG. 4 shows the second embodiment of a block 3' of a bearing assembly of the present invention. The block 3' forms a mounting portion 30'. A plurality of bulges 34' extends from the mounting portion 30' for slidingly engaging in the corresponding annular recess 24 of die bearings 2.

Figure 5:
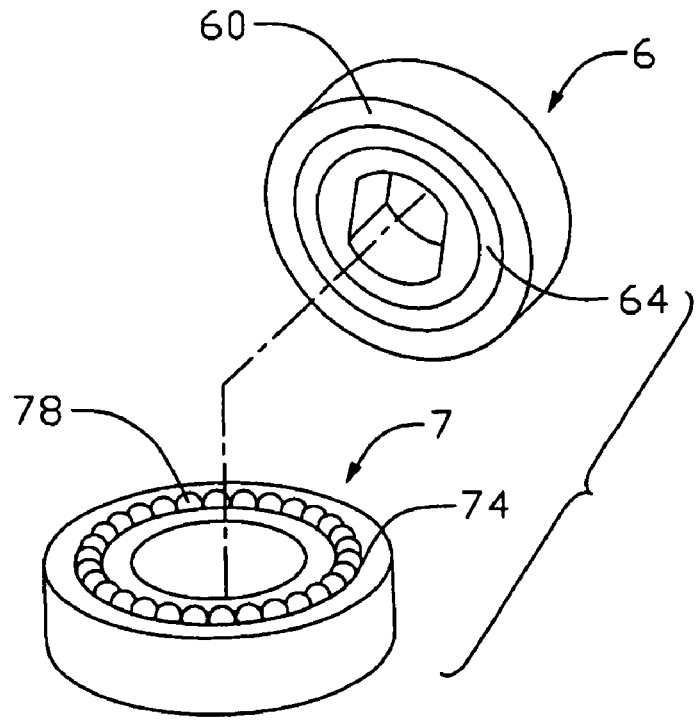
FIG. 5 is an isometric view of a rotary block and a sleeve bearing of the bearing system in accordance with another embodiment of the present invention.
Figure 6:
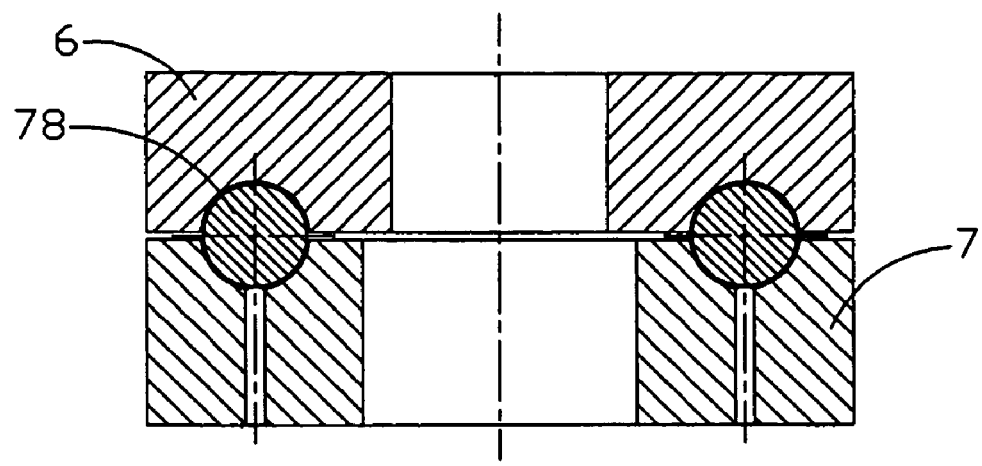
FIG. 6 is a cross-sectional assembled view of FIG. 5.

FIG. 5 and FIG. 6 show a rotary block 6 and a sleeve bearing 7 of the bearing system in accordance with another embodiment of the present invention. The bearing 7 defines an annular recess 74. A plurality of balls 78 is partly received in the recess 74. The rotary block 6 defines a mounting portion 60. An annular groove 64 is defined in the mounting portion 60 for cooperating with the recess 74 to receive the balls 78 when the mating portion 60 engages directly with the bearing 7. The bottom surface of the annular groove 64 contacts with the balls 78 when the rotary block 6 is disposed tightly next to the bearing 7. The balls 78 are rotatable in the annular groove 64 and the annular recess 74 when the shaft 1 rotates relative to the bearings 2.

Figure 7A:
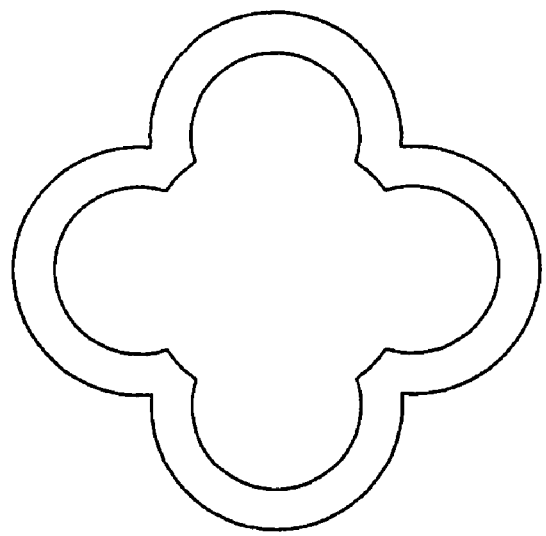
FIG. 7A is an axial plan view of a shaft and a rotary block in accordance with another embodiment of the invention.
Figure 7B:
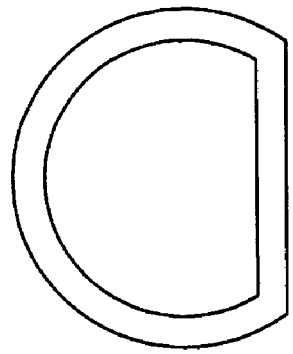
FIG. 7B is an axial plan view of a shaft and a rotary block in accordance with another embodiment of the invention.
Figure 8:
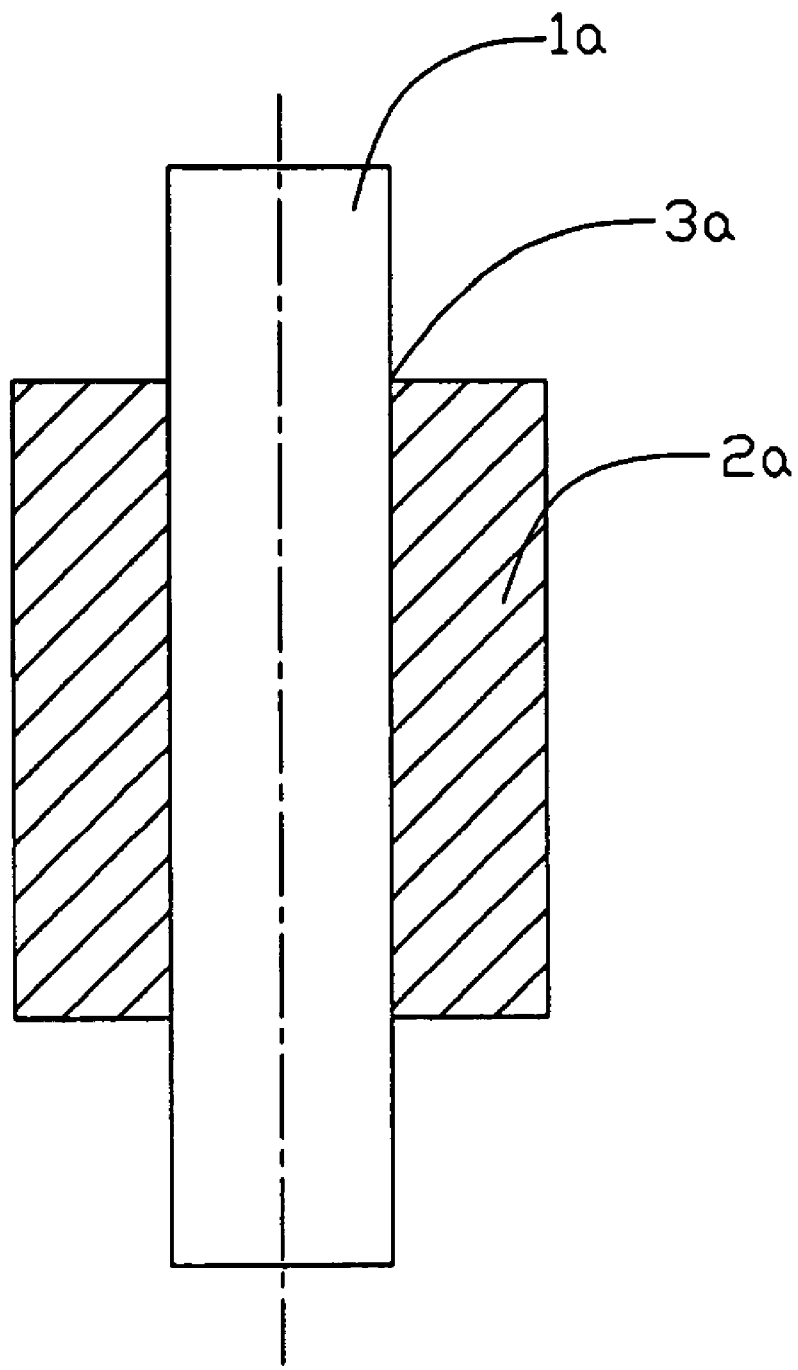
FIG. 8 is a cross-sectional view of a conventional bearing structure.

FIG. 7A and FIG. 7B show alternative configurations of the shalt 1 and the block. The shall has a non-cylindrical cross section. Referring to FIG. 7A, in an axial plan view, the cross section of the shaft comprises a plurality of lobes formed on the outer peripheral of the shaft. Referring to FIG. 7B, the shalt has a column shape with one section cut away from one side thereof. The block has a corresponding bore for receiving the shaft therein.

In the bearing assembly described above, the bearings 2 and 7 are spaced from each other by means of the shoulder 86 of the central tube 84. Alternatively, the sleeve bearings 2 and 7 are integrally made without the shoulder 86 located therebetween.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A bearing assembly comprising:
   a shaft adapted for being mounted to a rotary member;
   a block fixedly mounted on the shaft, and including a mounting portion;
   a sleeve bearing adapted for being mounted to a stationary member, the bearing having a mating portion confronting the mounting portion and a central bore receiving said shaft, a gap existing between an inner circumferential surface of the bearing and an outer circumferential surface of the shaft to allow the shaft to be capable of rotating in the bore without friction generating between the shaft and the bearing;
   a sliding member protruding from one of the mounting portion and the mating portion to rotatably enter in the other one of the mounting portion and the mating portion; and
   a coil spring being disposed on the shaft for providing a preset engaging pressure on the block toward the sleeve bearing in an axial direction of the shaft.

2. The bearing assembly as described in claim 1, wherein the mating portion defines an annular recess, and the sliding member is an annular flange extending from the mounting portion and being received in the corresponding recess.

3. The bearing assembly as described in claim 2, wherein the cross section of the flange is trapezoid, and a linear contact is formed between the flange and the bearing in the recess.

4. The bearing assembly as described in claim 1, wherein an annular recess is defined in the mating portion, and the sliding member comprises a plurality of bulges protruding from the mounting portion to slidably enter in the recess.

5. The bearing assembly as described in claim 1, wherein an annular recess is defined in the mating portion, and an annular groove is defined in the mounting portion, and the sliding member comprises a plurality of balls movably received between the recess and the groove.

6. The bearing assembly as described in claim 1, wherein a plurality of through holes is defined in the bearing for supplying lubricating oil to the sliding member.

7. The bearing assembly as described in claim 1, wherein the shaft has a non-cylindrical configuration, the block has a corresponding bore for receiving the shaft therein.

8. The bearing assembly as described in claim 1, wherein the cross section of the shaft comprises a plurality of lobes formed on the outer peripheral of the shaft.

9. The bearing assembly as described in claim 1, wherein the shaft has a column shape with one vertical section cut away.

10. A fan comprising:
    a frame defining a central tube;
    a stator being fixed around the central tube;
    a rotor pivotably surrounding the stator; and
    a bearing assembly received in the tube comprising a shaft secured with the rotor, a block being rotatable with the shaft and a bearing disposed around the shaft, the block being stationary relative to the bearing in an axial direction of the shaft, the block having a mounting portion, the bearing having a mating portion confronting the mounting portion and a central bore receiving said shaft, a sliding member protruding from one of the mounting portion and the mating portion to rotatably enter in the other one of the mounting portion and mating portion to cause the bearing to rotatably hold the rotor;

wherein a coil spring is disposed on the shaft for providing a preset engaging pressure between the block and the bearing in the axial direction.

11. The fan as described in claim 10, wherein a gap being existed between an inner circumferential surface of the bearing and an outer circumferential surface of the shaft to allow the shaft to rotate in the bearing without friction generating between the shaft and the bearing.

12. The fan as described in claim 10, wherein a cavity is formed between the shaft and the rube receiving absorbent material therein and the bearing defines at least one through hole for providing access for lubricating oil stored in the absorbent material to contact area between the block and the bearing.

13. The fan as described in claim 10, wherein the mating portion defines an annular recess, and the sliding member is an annular flange extending from the mounting portion and being received in the corresponding recess.

14. The fan as described in claim 13, wherein the cross section of the flange is trapezoid, and a linear contact is formed between the flange and bearing in the recess.

15. The fan as described in claim 10, wherein an annular recess is defined in the mating portion, and the sliding member comprises a plurality of bulges protruding from the mounting portion to slideably enter in the recess.

16. The fan as described in claim 10, wherein an annular recess is defined in the mating portion, and an annular groove is defined in the mounting portion, and the sliding member comprises a plurality of balls movably received between the recess and the groove.

17. A bearing assembly comprising:
a rotary shaft;
a block fixedly installed to the shaft and rotatable with said shaft, said block including a mounting portion with an extension formed therefrom;
a bearing having a mating portion confronting said mounting portion, said mating portion having a central bore to receive said shaft and allow frictionless rotation of said shaft in said bore, and a continuously extending recess formed on said mating portion to allow continuously slideable movement of said extension of said block in said extending recess; and
a coil spring being disposed on said shalt for providing a preset engaging pressure between said block and said bearing in an axial direction of said shaft.

18. The bearing assembly as described in claim 17, further comprising a absorbent material for holding lubricating oil, said material attached to said shaft and a slot formed in said bearing to allow oil from said material passing through and reaching said recess.

19. The bearing assembly as described in claim 17, wherein said extending recess is annular and said extension is a protruding annular flange.

* * * * *